United States Patent
Tateishi et al.

(10) Patent No.: US 9,262,402 B2
(45) Date of Patent: Feb. 16, 2016

(54) DEVICE, METHOD AND PROGRAM FOR ASSESSING SYNONYMOUS EXPRESSIONS

(75) Inventors: Kenji Tateishi, Tokyo (JP); Kai Ishikawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/117,297

(22) PCT Filed: May 9, 2012

(86) PCT No.: PCT/JP2012/003023
§ 371 (c)(1),
(2), (4) Date: Nov. 12, 2013

(87) PCT Pub. No.: WO2012/153524
PCT Pub. Date: Nov. 15, 2012

(65) Prior Publication Data
US 2014/0343922 A1    Nov. 20, 2014

(30) Foreign Application Priority Data

May 10, 2011   (JP) .................................. 2011-105589

(51) Int. Cl.
*G06F 17/27*   (2006.01)
(52) U.S. Cl.
CPC .................................. *G06F 17/2795* (2013.01)
(58) Field of Classification Search
CPC ... G06F 17/274; G06F 17/271; G06F 17/277; G06F 17/2785; G06F 17/278; G06F 17/2705; G06F 17/30734; G06F 17/99933
USPC ............... 704/1, 9, 10, 240, 257, 270, 4, 5, 8; 715/201
See application file for complete search history.

(56) References Cited

U.S. PATENT DOCUMENTS

| | | | | |
|---|---|---|---|---|
| 5,671,425 A | * | 9/1997 | Suematsu ............. | G06F 17/274 704/9 |
| 6,675,159 B1 | * | 1/2004 | Lin ...................... | G06F 17/2705 |
| 8,374,844 B2 | * | 2/2013 | Brun ..................... | G06F 17/278 704/1 |
| 8,594,996 B2 | * | 11/2013 | Liang ..................... | G06F 17/21 704/10 |

(Continued)

FOREIGN PATENT DOCUMENTS

CN        101894102 A       11/2010

OTHER PUBLICATIONS

Fujita and Sato, "A Probabilistic Model for Measuring Grammaticality and Similarity of Automatically Generated Paraphrases of Predicate Phrases", Proceedings of the 22$^{nd}$ International Conference on Computational Linguistics, pp. 225-232, Aug. 2008.*

(Continued)

*Primary Examiner* — Michael Colucci (57) ABSTRACT

A synonymous expression assessment device includes: synonymy assessment means for receiving input of binary relations each of which includes a nominal and a predicate, and assessing whether or not the input binary relations are synonymous using a similarity between input nominals and a similarity between input predicates; and inter-predicate similarity computation means for, when computing the similarity between the input predicates based on a distribution of occurrence frequencies of nominals that are in binary relations to the input predicate in a document set, performing the computation using a distribution of only nominals that are used in the same type of concept as the input nominal.

7 Claims, 4 Drawing Sheets

(a)

| | TONYU SURU | IRERU | TSUKERU | OCHIRU | ANTEI SURU |
|---|---|---|---|---|---|
| DENGEN | 10 | 10 | 10 | 10 | 10 |
| DENGEN SUITCHI | 10 | 10 | 10 | 2 | 2 |
| BOTAN | 10 | 10 | 10 | 2 | 2 |
| GAKKO | 0 | 0 | 0 | 0 | 0 |
| DAIGAKU | 0 | 0 | 0 | 0 | 0 |

(b)

| | TONYU SURU | IRERU | TSUKERU | OCHIRU | ANTEI SURU |
|---|---|---|---|---|---|
| DENGEN | 10 | 10 | 10 | 0 | 0 |
| DENGEN SUITCHI | 10 | 10 | 10 | 0 | 0 |
| BOTAN | 10 | 10 | 10 | 0 | 0 |
| GAKKO | 2 | 10 | 0 | 0 | 0 |
| DAIGAKU | 2 | 10 | 0 | 0 | 0 |

(56) References Cited

U.S. PATENT DOCUMENTS

| | | | |
|---|---|---|---|
| 2005/0071150 A1* | 3/2005 | Nasypny | G06F 17/30684 704/9 |
| 2005/0080613 A1* | 4/2005 | Colledge | G06F 17/2785 704/9 |
| 2005/0108001 A1* | 5/2005 | Aarskog | G06F 17/271 704/10 |
| 2007/0073533 A1* | 3/2007 | Thione | G06F 17/279 704/9 |
| 2009/0026560 A1 | 1/2009 | Wombacher et al. | |
| 2009/0063426 A1* | 3/2009 | Crouch | G06F 17/30616 |
| 2009/0083027 A1* | 3/2009 | Hollingsworth | G06F 17/277 704/9 |
| 2009/0326924 A1* | 12/2009 | Crider | G06F 17/2785 704/9 |
| 2009/0326925 A1* | 12/2009 | Crider | G06F 8/30 704/9 |
| 2010/0030553 A1 | 2/2010 | Ball | |
| 2010/0218076 A1* | 8/2010 | Ishikawa | G06F 17/2785 715/201 |

OTHER PUBLICATIONS

Lin, Zhao, Qin, and Zhou, "Identifying Synonyms among Distributionally Similar Words", Proceedings of the 18$^{th}$ International Joint Conference on Artificial Intelligence (IJCAI-03), pp. 1492-1493, 2003.*

Lin, D., "Automatic Retrieval and Clustering of Similar Words", Proceedings of COLING/ACL-98, pp. 768-774, 1998.*

Izumi, Shibata, Asano, Matsuo, and Kurohashi, "Constructing a Corpus of Japanese Predicate Phrases for Synonym/Antonym Relations", Proceedings of the Ninth International Conference on Language Resources and Evaluation (LREC'14), pp. 1394-1400, May 2014.*

Tomohide Shibata et al. "Context-dependent Synonymous Predicate Acquisition", IPSJ SIG Technical Report, Nov. 19, 2010, 2010-NL-199, No. 13.

Masato Hagiwara et al. "Supervised Synonym Acquisition Using Distributional Features and Syntactic Patterns", Journal of Natural Language Processing, Apr. 2009, pp. 59-83, vol. 16, No. 2.

Chikara Hashimoto et al., "Web-jo no Teigibun Kara no likae Chishiki Kakutoku", The Association for Natural Language Processing Dai 17 Kai Nenji Taikai Happyo Ronbunshu (Proceedings of the Seventeenth Annual Meeting of the Association for Natural Language Processing), [CD-ROM], Mar. 7, 2011, pp. 748-751. See cited doc. on p. 1 of International Search Report for explanation of relevance.

Ryo Nishimura et al., "Mailing List ni Toko sareta Mail o Riyo shite Aimai na Shitsumon ni Toikaesu Shitsumon Oto System no Sakusei", The Association for Natural Language Processing, Dai 13 Kai Nenji Taikai Happyo Ronbunshu (Proceedings of the Thirteenth Annual Meeting of The Association for Natural Language Processing), Mar. 19, 2007, pp. 1164-1167. See cited doc. on p. 1 of International Search Report for explanation of relevance.

International Search Report for PCT Application No. PCT/JP2012/003023, mailed on Jul. 24, 2012.

Chinese Office Action for CN Application No. 201280022780.9 isuued on Jun. 5, 2015 with English Translation.

* cited by examiner

|  | TONYU SURU | IRERU | TSUKERU | OCHIRU | ANTEI SURU |
|---|---|---|---|---|---|
| DENGEN | 10 | 10 | 10 | 10 | 10 |
| DENGEN SUITCHI | 10 | 10 | 10 | 2 | 2 |
| BOTAN | 10 | 10 | 10 | 2 | 2 |
| GAKKO | 2 | 10 | 0 | 10 | 2 |
| DAIGAKU | 2 | 10 | 0 | 10 | 2 |

|  | a1 | a2 | a3 | a4 | a5 |
|---|---|---|---|---|---|
| DENGEN | 0.8 | 0.2 | 0 | 0 | 0 |
| DENGEN SUITCHI | 0.8 | 0 | 0.2 | 0 | 0 |
| BOTAN | 0.6 | 0 | 0 | 0.4 | 0 |
| GAKKO | 0.1 | 0 | 0 | 0 | 0.9 |
| DAIGAKU | 0.1 | 0 | 0 | 0 | 0.9 |

(b)

|  | b1 | b2 | b3 | b4 | b5 |
|---|---|---|---|---|---|
| TONYU SURU | 0.8 | 0 | 0.2 | 0 | 0 |
| IRERU | 0.8 | 0.2 | 0 | 0 | 0 |
| TSUKERU | 0.7 | 0 | 0 | 0.3 | 0 |
| OCHIRU | 0.2 | 0 | 0 | 0 | 0.8 |
| ANTEI SURU | 0.2 | 0 | 0 | 0 | 0.8 |

|  | TONYU SURU | IRERU | TSUKERU | OCHIRU | ANTEI SURU |
|---|---|---|---|---|---|
| DENGEN | 10 | 10 | 10 | 10 | 10 |
| DENGEN SUITCHI | 10 | 10 | 10 | 2 | 2 |
| BOTAN | 10 | 10 | 10 | 2 | 2 |
| GAKKO | 0 | 0 | 0 | 0 | 0 |
| DAIGAKU | 0 | 0 | 0 | 0 | 0 |

(b)

|  | TONYU SURU | IRERU | TSUKERU | OCHIRU | ANTEI SURU |
|---|---|---|---|---|---|
| DENGEN | 10 | 10 | 10 | 0 | 0 |
| DENGEN SUITCHI | 10 | 10 | 10 | 0 | 0 |
| BOTAN | 10 | 10 | 10 | 0 | 0 |
| GAKKO | 2 | 10 | 0 | 0 | 0 |
| DAIGAKU | 2 | 10 | 0 | 0 | 0 |

FIG. 6

| P(TONYU SURU \| IRERU)= | CONVENTIONAL TECHNIQUE | PROPOSED TECHNIQUE |
|---|---|---|
| P(TONYU \| DENGEN)P(DENGEN \| IRERU)+ | 10/34 × 10/50 =0.04 | 10/50 × 10/30 =0.067 |
| P(TONYU \| DENGEN SUITCHI) P(DENGEN SUITCHI \| IRERU)+ | 10/34 × 10/50 =0.059 | 10/34 × 10/30 =0.098 |
| P(TONYU \| BOTAN)P(BOTAN \| IRERU)+ | 10/34 × 10/50 =0.059 | 10/34 × 10/30 =0.098 |
| P(TONYU \| GAKKO)P(GAKKO \| IRERU)+ | 2/24 × 10/50 =0.017 | 0 |
| P(TONYU \| DAIGAKU)P(DAIGAKU \| IRERU) | 2/24 × 10/50 =0.017 | 0 |
| = | 0.192 | 0.263 |

FIG. 7

| P(DENGEN SUITCHI \| DENGEN)= | CONVENTIONAL TECHNIQUE | PROPOSED TECHNIQUE |
|---|---|---|
| P(DENGEN SUITCHI \| TONYU SURU) P(TONYU SURU \| DENGEN)+ | 10/34 × 10/50 =0.059 | 10/34 × 10/30 =0.098 |
| P(DENGEN SUITCHI \| IRERU) P(IRERU \| DENGEN)+ | 10/50 × 10/50 =0.04 | 10/50 × 10/30 =0.067 |
| P(DENGEN SUITCHI \| TSUKERU) P(TSUKERU \| DENGEN)+ | 10/30 × 10/50 =0.067 | 10/30 × 10/30 =0.111 |
| P(DENGEN SUITCHI \| OCHIRU) P(OCHIRU \| DENGEN)+ | 2/34 × 10/50 =0.012 | 0 |
| P(DENGEN SUITCHI \| ANTEI SURU) P(ANTEI SURU \| DENGEN) | 2/18 × 10/50 =0.022 | 0 |
| = | 0.2 | 0.276 |

FIG. 8

DEVICE, METHOD AND PROGRAM FOR ASSESSING SYNONYMOUS EXPRESSIONS

This application is a National Stage Entry of PCT/JP2012/003023 filed May 9, 2012, which claims priority from Japanese Patent Application 2011-105589 filed May 10, 2011, the contents of all of which are incorporated herein by reference, in their entirety.

TECHNICAL FIELD

The present invention relates to a synonymous expression assessment device, a synonymous expression assessment method, and a synonymous expression assessment program for assessing whether or not expressions are synonymous.

BACKGROUND ART

A synonymous expression dictionary is one of the language resources necessary for conducting accurate search in response to a query with a complex syntactic structure such as a natural sentence. Synonymous expressions typically need to be organized for each field of documents to be searched. Securing experts with special knowledge for a long time, however, requires significant manpower cost. Hence, there is demand for a technique of automatically organizing the synonymous expression dictionary.

Consider, in particular, automatic extraction of synonymous expressions of binary relations each of which is represented by a combination of a nominal and a predicate. For example, "dengen o ireru (activate the power)" and "dengen suitchi o tonyu suru (turn on the power switch)" are synonymous expressions of binary relations each of which is represented by a combination of a nominal and a predicate. A predicate included in an input binary relation is hereafter referred to as "input predicate", and a nominal included in the input binary relation as "input nominal".

As a technique of extracting synonymous expressions of binary relations, there is a method in which surrounding contexts of binary relations are collected from a document set as feature values and binary relations having similar feature values are extracted as synonymous expressions, as described in Non Patent Literature (NPL) 1. The surrounding contexts used here include a predicate modified by the input predicate and a nominal, other than the input nominal, that is in a case relation to the input predicate in the document set. For instance, from a sentence "daigaku o shuseki de sotsugyo shi kaisha ni shushoku suru (graduate from the university with top honors and enter the company)", "shuseki de (with top honors)" and "shushoku suru (enter)" are acquired as feature values of a binary relation "daigaku o sotsugyo suru (graduate from the university)".

As another technique of extracting synonymous expressions of binary relations, there is a method in which, for each of an input predicate pair and an input nominal pair, whether or not the pair are in a synonymous relation is separately assessed and, in the case of assessing that both the input predicate pair and the input nominal pair are synonymous, they are extracted as synonymous expressions. This can be done simply by applying a technique of extracting synonymous expressions of nominals described in NPL 2. NPL 2 describes a technique of collecting, as a feature value of each input nominal, a distribution of occurrence frequencies of predicates that are in binary relations to the input nominal in a document set, and extracting input nominals having similar feature values as synonymous expressions.

CITATION LIST

Non Patent Literature(s)

NPL 1: Tomohide Shibata, Sadao Kurohashi, "Context-dependent Synonymous Predicate Acquisition", IPSJ SIG Technical Report, 2010-NL-199, No. 13, 2010.

NPL 2: Masato Hagiwara, Yasuhiro Ogawa, Katsuhiko Takeyama, "Supervised Synonym Acquisition Using Distributional Features and Syntactic Patterns", Journal of Natural Language Processing, Vol.16, No.2, pp.59-83, 2009.

SUMMARY OF INVENTION

Technical Problem

However, in the method described in NPL 1, it is difficult to sufficiently acquire feature values for extracting synonymous expressions of binary relations, because no feature value can be acquired from a sentence that contains only a binary relation.

In the method described in NPL 2, in the case where the input predicates or the input nominals are polysemous, their feature values are not similar, making it impossible to assess synonymous binary relations.

As an example, in synonymy assessment of "dengen suitchi o tonyu suru (turn on the power switch)" and "dengen o ireru (activate the power)", it is necessary to assess whether or not "dengen suitchi" and "dengen" are synonymous. Let a meaning A be the meaning of "tonyu suru" and "ireru" determined by "dengen o ireru (activate the power)" and "dengen suitchi o tonyu suru (turn on the power switch)". The feature values (the distributions of the occurrence frequencies of the nominals that are in binary relations to the input predicates) in the case where "tonyu suru" and "ireru" are used in the meaning A are similar. The feature values in the case where "tonyu suru" and "ireru" are used in a meaning other than the meaning A, however, are not necessarily similar. Thus, the feature values of "tonyu suru" and "ireru" are not similar. The same problem applies to "dengen suitchi" and "dengen".

In view of this, the present invention has an object of providing a synonymous expression assessment device, a synonymous expression assessment method, and a synonymous expression assessment program capable of properly assessing synonymous expressions of binary relations even in the case where input predicates or input nominals are polysemous.

Solution to Problem

A synonymous expression assessment device according to the present invention includes: synonymy assessment means for receiving input of binary relations each of which includes a nominal and a predicate, and assessing whether or not the input binary relations are synonymous using a similarity between input nominals and a similarity between input predicates; and inter-predicate similarity computation means for, when computing the similarity between the input predicates based on a distribution of occurrence frequencies of nominals that are in binary relations to the input predicate in a document set, performing the computation using a distribution of only nominals that are used in the same type of concept as the input nominal.

A synonymous expression assessment method according to the present invention includes: receiving input of binary relations each of which includes a nominal and a predicate, and assessing whether or not the input binary relations are synonymous using a similarity between input nominals and a similarity between input predicates; and when computing the similarity between the input predicates based on a distribution of occurrence frequencies of nominals that are in binary relations to the input predicate in a document set, performing the computation using a distribution of only nominals that are used in the same type of concept as the input nominal.

A synonymous expression assessment program according to the present invention causes a computer to execute: a synonymy assessment process of receiving input of binary relations each of which includes a nominal and a predicate, and assessing whether or not the input binary relations are synonymous using a similarity between input nominals and a similarity between input predicates; and an inter-predicate similarity computation process of, when computing the similarity between the input predicates based on a distribution of occurrence frequencies of nominals that are in binary relations to the input predicate in a document set, performing the computation using a distribution of only nominals that are used in the same type of concept as the input nominal.

Advantageous Effects of Invention

According to the present invention, synonymous expressions of binary relations can be properly assessed even in the case where input predicates or input nominals are polysemous.

DESCRIPTION OF EMBODIMENT(S)

Figure 1:
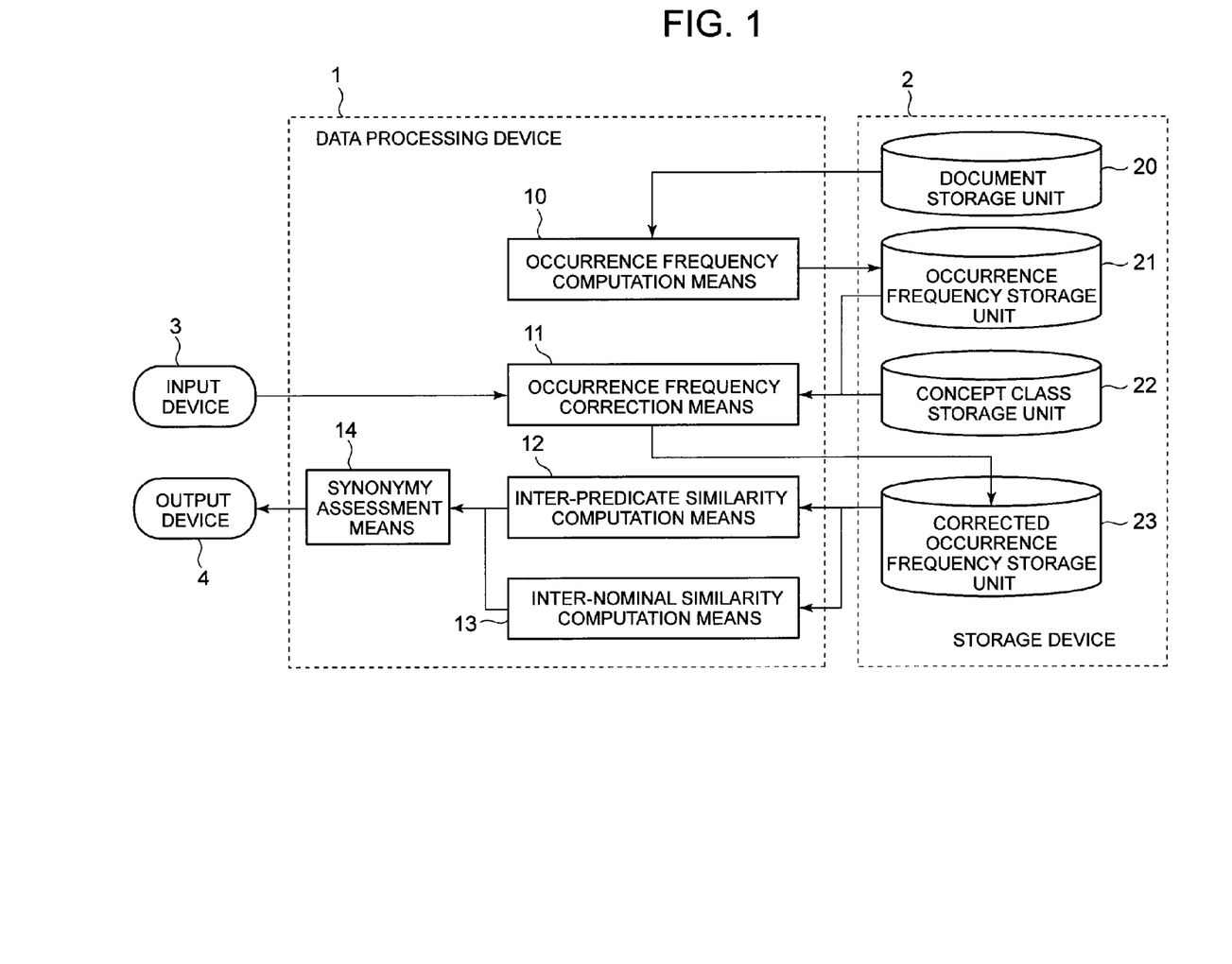
FIG. 1 is a diagram showing an example of a structure of a synonymous expression assessment device according to the present invention.

The following describes an exemplary embodiment of the present invention with reference to drawings. FIG. 1 is a diagram showing an example of a structure of a synonymous expression assessment device according to the present invention. As shown in FIG. 1, the synonymous expression assessment device according to the present invention includes: a data processing device 1 that operates under program control; a storage device 2 for storing information; an input device 3 such as a keyboard; and an output device 4 such as a display device.

The input device 3 has a function of inputting data indicating two binary relations to the data processing device 1 according to a user operation or the like. A binary relation represents a combination of a predicate and a nominal that is in a case relation to the predicate. For example, the input device 3 inputs data indicating "dengen—ireru (power—activate)" and data indicating "dengen suitchi—tonyu suru (power switch—turn on)" to the data processing device 1, as two binary relations. Though this exemplary embodiment describes an example where the input device 3 inputs two binary relations to the data processing device 1, the number of input binary relations is not limited to two and may be three or more.

The output device 4 has a function of outputting processing results by the data processing device 1. For example, the output device 4 is realized by a display device such as a display, and displays the processing results by the data processing device 1 on a display unit.

The data processing device 1 includes occurrence frequency computation means 10, occurrence frequency correction means 11, inter-predicate similarity computation means 12, inter-nominal similarity computation means 13, and synonymy assessment means 14. The data processing device 1 is specifically realized by an information processing device such as a personal computer that operates according to a program.

The occurrence frequency computation means 10 has a function of extracting binary relations from document data (hereafter simply referred to as "document") stored in a document storage unit 20 and computing an occurrence frequency of each binary relation. The occurrence frequency computation means 10 is specifically realized by a CPU of an information processing device that operates according to a program.

The occurrence frequency correction means 11 has a function of determining, for each predicate or nominal included in the document set, a degree to which the predicate or the nominal is used in the same concept as the input predicate or the input nominal, with reference to a concept class storage unit 22. The occurrence frequency correction means 11 also has a function of correcting the occurrence frequency of each binary relation included in the document set according to the determined degree. The occurrence frequency correction means 11 is specifically realized by a CPU of an information processing device that operates according to a program.

The inter-predicate similarity computation means 12 has a function of setting, as a feature value of each input predicate, a distribution of occurrence frequencies or corrected occurrence frequencies of nominals that are in binary relations to the input predicate in the document set, and computing a degree of similarity between feature values of the input predicates. The inter-predicate similarity computation means 12 is specifically realized by a CPU of an information processing device that operates according to a program.

The inter-nominal similarity computation means 13 has a function of setting, as a feature value of each input nominal, a distribution of occurrence frequencies or corrected occurrence frequencies of predicates that are in binary relations to the input nominal in the document set, and computing a degree of similarity between feature values of the input nominals. The inter-nominal similarity computation means 13 is specifically realized by a CPU of an information processing device that operates according to a program.

The synonymy assessment means 14 has a function of assessing the input two binary relations as synonymous expressions in the case where the similarity between the predicates and the similarity between the nominals satisfy a predetermined condition, and outputting the assessment results to the output device 4. The synonymy assessment means 14 is specifically realized by a CPU of an information processing device that operates according to a program.

The storage device 2 includes the document storage unit 20, an occurrence frequency storage unit 21, a same class belonging probability storage unit 22, and a corrected occurrence frequency storage unit 23. The storage device 2 is specifically realized by an optical disk device, a magnetic disk device, or the like.

The document storage unit 20 stores the document set. The occurrence frequency storage unit 21 stores data indicating occurrence frequencies of binary relations included in the document set. For example, these data indicating the occurrence frequencies are registered in the occurrence frequency storage unit 21 by the occurrence frequency computation means 10.

The concept class storage unit 22 stores data indicating types of concept classes to which predicates or nominals belong. For example, these data are manually determined and registered in the concept class storage unit 22 beforehand, or automatically computed based on statistical values and the like and registered in the concept class storage unit 22.

The corrected occurrence frequency storage unit 23 stores data indicating corrected occurrence frequencies of binary relations. For example, these data are registered in the corrected occurrence frequency storage unit 23 by the occurrence frequency correction means 11.

Figure 2:
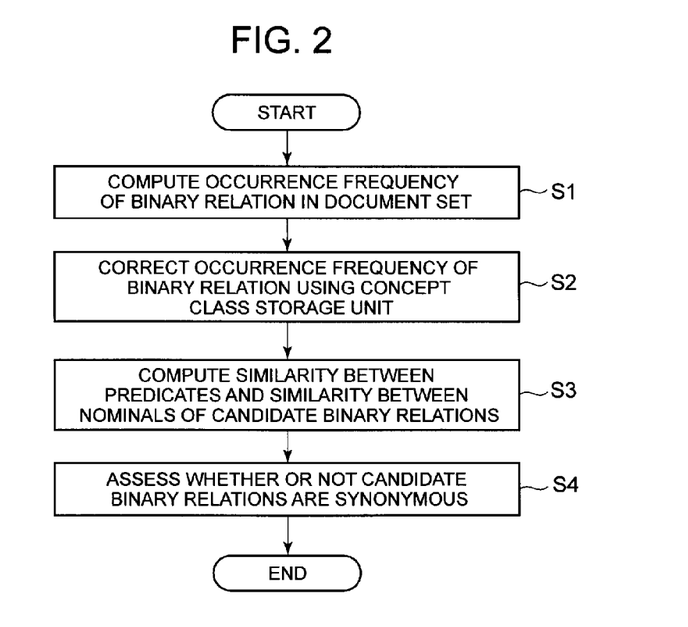
FIG. 2 is a flowchart showing an example of processes executed by the synonymous expression assessment device.

The operation in this exemplary embodiment is described next, with reference to FIG. 2. FIG. 2 is a flowchart showing an example of processes executed by the synonymous expression assessment device. The following describes, as an example, the case where the input device 3 inputs data indicating "dengen—ireru (power—activate)" and data indicating "dengen suitchi—tonyu suru (power switch—turn on)" to the data processing device 1 as two binary relations.

When the above-mentioned data indicating the two binary relations are input from the input device 3, the occurrence frequency computation means 10 extracts binary relations from the documents stored in the document storage unit 20, and computes an occurrence frequency of each binary relation (step S1 in FIG. 2). A binary relation represents a combination of a predicate and a nominal that is in a case relation to the predicate.

In step S1, the occurrence frequency computation means 10 extracts the binary relations included in the documents using, for example, a morphological analysis/syntactic analysis tool such as CaboCha. CaboCha is described in the literature (http://chasen.org/~taku/software/cabocha/).

The occurrence frequency computation means 10 segments a sentence into words and assigns a part of speech to each word, using the morphological analysis tool. Suppose the sentence "dengen suitchi o tonyu suru (turn on the power switch)" is morphologically analyzed. The morphological analysis results "dengen [noun-general]/suitchi [noun-general]/o [particle-case]/tonyu [noun-verbal]/suru [verb-free]" are then output. Following this, the occurrence frequency computation means 10 combines the morphological analysis results into clauses and assigns dependency relations between the clauses, using the syntactic analysis tool. The above-mentioned morphological analysis results are combined into two clauses, i.e. (1) {dengen/suitchi/o} and (2) {tonyu/suru}, and a dependency relation that (1) is a dependent and (2) is a head is assigned between the clause (1) and the clause (2).

The occurrence frequency computation means 10 extracts each binary relation using the morphological analysis/syntactic analysis results, by the following method. The occurrence frequency computation means 10 first detects a predicate clause. The predicate clause is a clause whose first morpheme is "verb-free", "noun-adjective(-na)", or "noun-verbal".

The occurrence frequency computation means 10 then assesses whether or not a clause which is a dependent of the predicate clause is a nominal clause in a case relation to the predicate clause. The nominal clause is a clause whose first morpheme is "noun-general", "noun-verbal", or "noun-adjective(-na)". Whether or not the nominal clause is in a case relation to the predicate clause is determined based on whether or not the last morpheme of the nominal clause is "particle-case" or "particle-binding".

Lastly, the occurrence frequency computation means 10 recognizes, as the nominal, the word sequence of the nominal clause from which the particle in the case relation to the predicate is removed, and recognizes, as the predicate, the word sequence of the predicate clause. In the above-mentioned example, "dengen suitchi—tonyu suru" is obtained.

Here, the particle in the case relation to the predicate may be included in the nominal. In this case, "dengen suitchi o—tonyu suru" is obtained. The inclusion of such a particle enables a distinction between different meanings of binary relations due to their difference in particle. There is, however, also a disadvantage that occurrence frequencies are more distributed.

Figure 3:
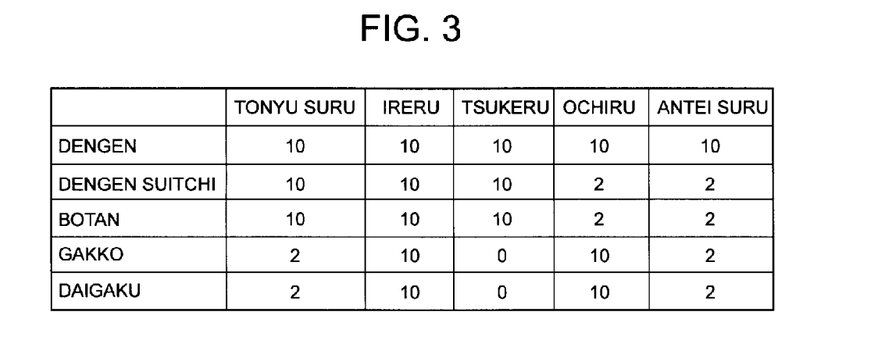
FIG. 3 is an explanatory diagram showing an example of data stored in an occurrence frequency storage unit.

The occurrence frequency computation means 10 computes the occurrence frequency of each extracted binary relation, and stores the computation results in the occurrence frequency storage unit 21. FIG. 3 shows an example of data stored in the occurrence frequency storage unit. In the example shown in FIG. 3, the vertical axis represents the nominals, the horizontal axis represents the predicates, and the values in the table represent the occurrence frequencies of the binary relations. For instance, the occurrence frequency of "dengen suitchi—tonyu suru" is 10.

Next, the occurrence frequency correction means 11 determines, for each predicate or nominal included in the document set, a degree to which the predicate or the nominal is used in the same concept as the input predicate or the input nominal, with reference to the concept class storage unit 22. The occurrence frequency correction means 11 corrects the occurrence frequency of each binary relation included in the document set, according to the determined degree (step S2 in FIG. 2).

The concept class storage unit 22 stores data indicating types of concept classes to which predicates or nominals belong. These values are stored beforehand. Probability values may be manually determined, or automatically determined through computation. A method of automatically determining probability values is described below.

A type of a concept class to which a nominal belongs is determined using probabilistic clustering such as GMM (multivariate normal distribution). GMM is described, for example, in the literature (http://convexbrain.sourceforge.jp/cgi-bin/wifky.pl?p=GMM). There are various methods of probabilistic clustering other than GMM. For instance, PLSI (Thomas Hofmann, Probabilistic latent semantic indexing, Proceedings of the 22nd annual international ACM SIGIR conference on Research and development in information retrieval (SIGIR1999), pp. 50-57, 1999.) may be used.

In probabilistic clustering using GMM, assuming that the number K of concept classes is designated beforehand, each concept class a ($1 \leq a \leq K$) has one multivariate normal distribution. A nominal N is represented by vector data whose number of dimensions is the number of types of predicates, and the value of each dimension is an occurrence frequency of a predicate which is the head of the nominal N. Accordingly, the number of dimensions of the multivariable normal distribution is also the number of types of predicates V.

A probability $P(a|N)$ that the nominal N belongs to a is computed using an EM algorithm. First, arbitrary $P(a|N)$ is given as an initial state. Next, the mean and variance of the multivariate normal distribution of a are updated based on P(a|N). P(a|N) is then updated based on the new multivariate normal distribution. This is repeated a finite number of times, to determine P(a|N).

Figure 4:
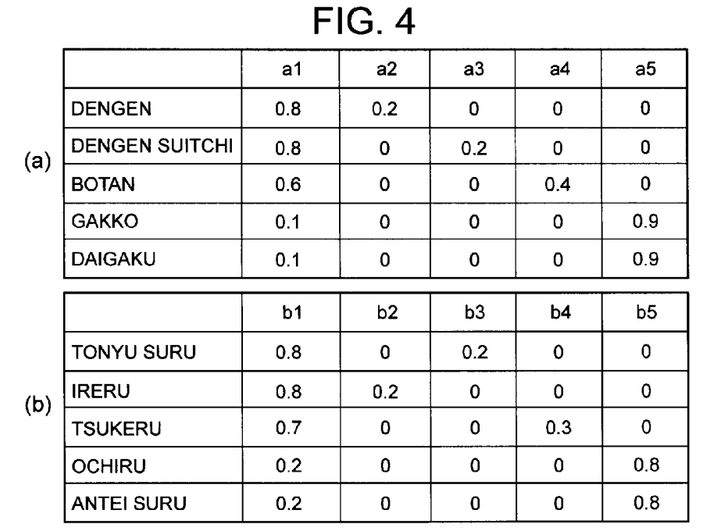
FIG. 4 is an explanatory diagram showing an example of data stored in a concept class storage unit.

(a) in FIG. 4 shows an example of concept classes to which nominals belong, which are stored in the concept class storage unit 22. There are five concept classes a1 to a5. Each concept class to which a nominal belongs is given the probability P(a|N).

A type of a concept class to which a predicate belongs is determined by the same computation method. (b) in FIG. 4 shows an example of concept classes to which predicates belong, which are stored in the concept class storage unit 22. There are five concept classes b1 to b5. Each concept class to which a predicate belongs is given the probability.

The occurrence frequency correction means 11 computes the degree to which the predicate or nominal included in the document set is used in the same concept as the input predicate or the input nominal, with reference to the concept class storage unit 22. The occurrence frequency correction means 11 first computes the degree CS(N, IN) to which the nominal N included in the document set is used in the same concept as the input nominal IN, using the following equation (1).

$$CS(N,IN)=\Sigma a \min\{P(a|N), P(a|IN)\} \quad \text{Equation (1)}.$$

Here, a denotes the concept class, and P(a|N) denotes the probability of N belonging to a. Since there are two input nominals IN1 and IN2, the occurrence frequency correction means 11 computes the degree CS(N, IN1, IN2) to which the nominal N included in the document set is used in the same concept as the input nominals IN1 and IN2, using the following equation (2).

$$CS(N,IN1,IN2)=\text{Max}\{CN(N,IN1), CN(N,IN2)\} \quad \text{Equation (2)}.$$

In this example, the input nominals are "dengen (power)" and "dengen suitchi (power switch)". The nominals included in the document set are "dengen (power)", "dengen suitchi (power switch)", "botan (button)", "gakko (school)", and "daigaku (university)", as shown in FIG. 3. Computing CS from these yields the following results.

$CS(\text{dengen,dengen,dengen suitchi})=\text{Max}\{CN(\text{dengen, dengen}), CN(\text{dengen,dengen suitchi})\}=1.0.$ CS(dengen suitchi,dengen suitchi)=1.0.
CS(botan,dengen,dengen suitchi)=0.6.
CS(gakko,dengen,dengen suitchi)=0.1.
CS(daigaku,dengen,dengen suitchi)=0.1.

In the same manner, the occurrence frequency correction means 11 computes the degree to which the predicate P included in the document set is used in the same concept as the input predicates IP1 and IP2, using the following equations (3) and (4).

$$CS(P,IP1,IP2)=\text{Max}\{CN(P,IP1), CN(P,IP2)\} \quad \text{Equation (3)}.$$

$$CS(P,IP)=\Sigma b \min\{P(P,b), P(IP,b)\} \quad \text{Equation (4)}.$$

In this example, the input predicates are "ireru (activate)" and "tonyu suru (turn on)". The predicates included in the document set are "tonyu suru (turn on)", "ireru (activate)", "tsukeru (switch on)", "ochiru (drop)", and "antei suru (stabilize)", as shown in FIG. 3. Computing CS from these yields the following results.

CS(tonyu suru,ireru,tonyu suru)=1.0.
CS(ireru,ireru,tonyu suru)=1.0.
CS(tsukeru,ireru,tonyu suru)=0.7.
CS(ochiru,ireru,tonyu suru)=0.2.
CS(antei suru,ireru,tonyu suru)=0.2.

Note that the computation method of CS is not limited to the above. Other methods include, for example, a method in which the number of concept classes common to two nominals or predicates is set as CS, and a method in which CS=1 in the case where a concept class with a highest probability value is common to two nominals or predicates and CS=0 otherwise.

Figure 5:
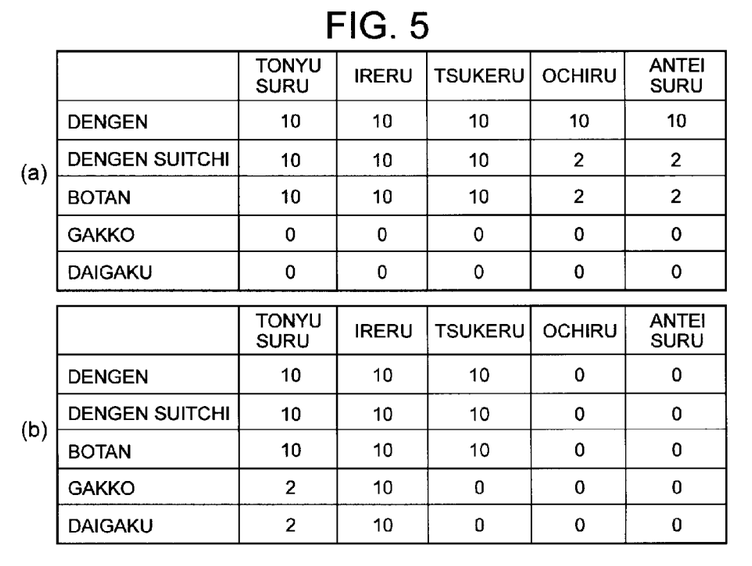
FIG. 5 is an explanatory diagram showing an example of data stored in a corrected occurrence frequency storage unit.

The occurrence frequency correction means 11 then corrects the occurrence frequency of each binary relation stored in the occurrence frequency storage unit 21, using the above-computed CS. There are the correction with respect to the predicate of the binary relation and the correction with respect to the nominal of the binary relation, which respectively use CS(P, IP1, IP2) and CS(N, NP1, NP2) mentioned above. An example of the correction method is a method of setting the occurrence frequency to 0 if CS is less than a predetermined threshold. (a) in FIG. 5 shows an example of occurrence frequencies corrected with respect to the nominal of each binary relation with the threshold being set to 0.6, which are stored in the corrected occurrence frequency storage unit 23. Likewise, (b) in FIG. 5 shows an example of occurrence frequencies corrected with respect to the predicate of each binary relation with the threshold being set to 0.6. Another example of the correction method is a method of multiplying the occurrence frequency by CS.

Next, the inter-predicate similarity computation means 12 sets, as a feature value of each input predicate, a distribution of occurrence frequencies or corrected occurrence frequencies of nominals that are in binary relations with the input predicate in the document set, and computes a degree of similarity between feature values of the input predicates. Moreover, the inter-nominal similarity computation means 13 sets, as a feature value of each input nominal, a distribution of occurrence frequencies or corrected occurrence frequencies of predicates that are in binary relations with the input nominal in the document set, and computes a degree of similarity between feature values of the input nominals (step S3 in FIG. 2). The processes executed by the inter-predicate similarity computation means 12 and the inter-nominal similarity computation means 13 may be in any order.

The inter-predicate similarity computation means 12 first sets, as the feature value of each input predicate, the distribution of the occurrence frequencies or corrected occurrence frequencies of the nominals that are in binary relations to the input predicate in the document set. For example, when the input predicates are denoted by V1 and V2, the inter-predicate similarity computation means 12 sets $\{P(V1|n)|n \in N\}$ and $\{P(n|V2)|n \in N\}$ as the feature values of the input predicates. P(V1|n) and P(n|V2) respectively denote the values (probabilities in this example) obtained by normalizing the corrected occurrence frequencies of the nominals that are in binary relations to V1 and V2, and n denotes any nominal selected from a universal set N. The corrected occurrence frequency mentioned here is the occurrence frequency corrected with respect to the nominal in the occurrence frequency correction means 11.

The inter-predicate similarity computation means 12 then computes Score(V1, V2) which is the degree of similarity between the feature values of the predicates. In detail, the inter-predicate similarity computation means 12 computes Score(V1, V2) using the following equation (5).

$$\text{Score}(V1,V2)=P(V1|V2)=\Sigma_{n \in N} P(V1|n) \times P(n|V2) \quad \text{Equation (5)}.$$

The computation method of Score is not limited to the method that uses the equation (5). For example, Score may be computed based on Cosine similarity, using $\{f(V1, n)|n \in N\}$ and $\{f(V2, n)|n \in N\}$ as the feature values of the predicates of the input binary relations. Here, f(V1, n) and f(V2, n) denote the corrected occurrence frequencies of the binary relations corresponding to V1 and V2 respectively.

Figure 6:
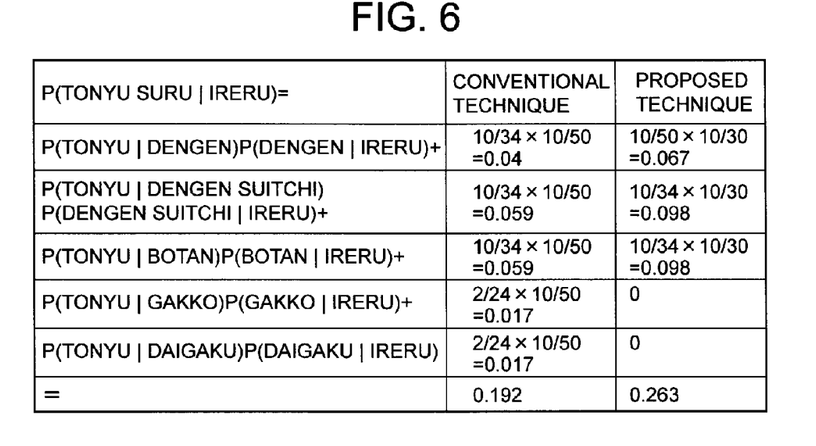
FIG. 6 is a diagram showing an example of a computation method by inter-predicate similarity computation means.

The proposed technique column in FIG. 6 shows the results of computing Score(V1, V2)=P(tonyu suru|ireru) using the corrected occurrence frequencies. In the example shown in FIG. 6, Score(V1, V2)=0.263.

The inter-nominal similarity computation means 13 computes the degree of similarity between the feature values of the input nominals, in the same manner as the inter-predicate similarity computation means 12. When the nominals of the binary relations are denoted by N1 and N2, P(N1|v) and P(v|N2) respectively denote the values (probabilities in this example) obtained by normalizing the corrected occurrence frequencies of the predicates that are in binary relations to N1 and N2, and v denotes any predicate selected from a universal set V.

The inter-nominal similarity computation means 13 computes Score(N1, N2) which is the degree of similarity between the feature values of the predicates. In detail, the inter-nominal similarity computation means 13 computes Score(N1, N2) using the following equation (6).

$$Score(N1, N2) = P(N1|N2) = \Sigma_{v \in V} P(N1|v) \times P(v|N2) \quad \text{Equation (6)}.$$

Figure 7:
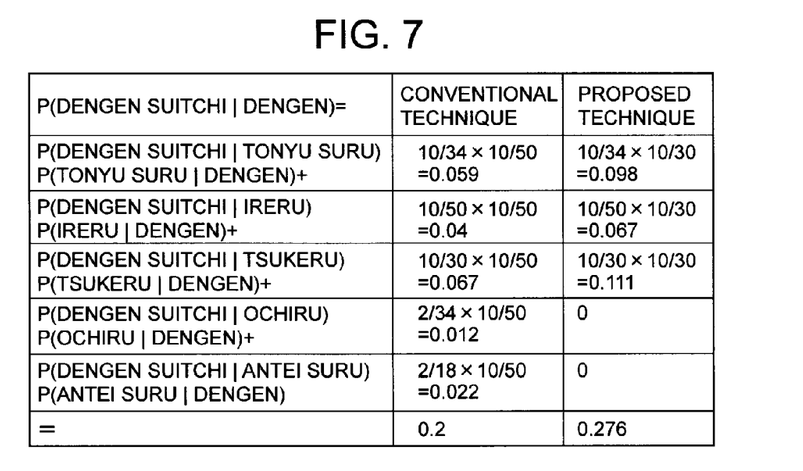
FIG. 7 is a diagram showing an example of a computation method by inter-nominal similarity computation means.

The proposed technique column in FIG. 7 shows the results of computing Score(N1, N2)=P(dengen suitchi|dengen) using the corrected occurrence frequencies. In the example shown in FIG. 7, Score(N1, N2)=0.276.

Next, the synonymy assessment means 14 assesses the input two binary relations as synonymous expressions in the case where the similarity between the predicates and the similarity between the nominals satisfy a predetermined condition, and outputs the assessment results to the output device 4 (step S4 in FIG. 2).

The predetermined condition is, for example, that the product of the similarity between the predicates and the similarity between the nominals is not less than a designated value. In this case, Score(V1, V2)×Score(N1, N2)=0.263× 0.274=0.072. The applied method is not limited to this. Other methods include, for example, a method using the sum or mean of the similarities instead of the product of the similarities, and a method using a condition that each of the similarity between the predicates and the similarity between the nominals is not less than a designated value.

Though the input device 3 and the output device 4 are used as a human-computer interface in this exemplary embodiment, the input gdevice 3 and the output device 4 may be used to receive the input from another device or system and output the assessment results to the device or the like. In this case, the synonymy assessment means 14 may directly output the product of the similarities or the like. Alternatively, the computation results of the inter-predicate similarity computation means 12 and the inter-nominal similarity computation means 13 may be directly output, without using the synonymy assessment means 14.

The advantageous effects of this exemplary embodiment are described below. In this exemplary embodiment, synonymous expressions of binary relations can be properly assessed even in the case where input predicates or input nominals are polysemous. This is possible because, when computing the similarity between the input predicates, the distribution of the occurrence frequencies of only the predicates that are used in the same type of concept as the input predicate is used as the feature value and, when computing the similarity between the input nominals, the distribution of the occurrence frequencies of only the nominals that are used in the same type of concept as the input nominal is used as the feature value.

Let a meaning A be the meaning of the input predicate determined by its relation to the input nominal. Using, as the feature value, the distribution of the occurrence frequencies of only the nominals having the same type of concept as the input nominal signifies that the distribution of the occurrence frequencies of the nominals that are in binary relations to the input predicate used in the meaning A is used as the feature value. Therefore, the feature values of the input predicates which are synonymous expressions are similar.

For example, let the meaning A be the meaning of "tonyu suru" and "ireru" determined by "dengen o ireru (activate the power)" and "dengen suitchi o tonyu suru (turn on the power switch)". Using, as the feature value, the occurrence frequencies of only the nominals having the same type of concept as the input nominal signifies that the distribution of the occurrence frequencies of the nominals that are in binary relations to "tonyu suru" and "ireru" used in the meaning A is used as the feature value. This is because the meaning of "tonyu suru" and "ireru" determined by "[nominal having the same type of concept as "dengen" or "dengen suitchi"] o tonyu suru" and "[nominal having the same type of concept as "dengen" or "dengen suitchi"] o ireru" can be equally regarded as the meaning A. Therefore, the feature values of "tonyu suru" and "ireru" are similar.

Likewise, let a meaning B be the meaning of the input nominal determined by its relation to the input predicate. Using, as the feature value, the distribution of the occurrence frequencies of only the predicates having the same type of concept as the input predicate signifies that the distribution of the occurrence frequencies of the predicates that are in binary relations to the input nominal used in the meaning B is used as the feature value. Therefore, the feature values of the input nominals which are synonymous expressions are similar.

FIGS. 6 and 7 respectively show the comparison of the computed value of the similarity between the input predicates between the technique described in NPL 2 and the proposed technique (i.e. in this exemplary embodiment) and the comparison of the computed value of the similarity between the input nominals between the technique described in NPL 2 and the proposed technique. In the case of using the technique described in NPL 2, the similarity between the input nominals is 0.192, the similarity between the input predicates is 0.2, and their product is 0.038. In the case of using the proposed technique, on the other hand, the similarity between the input nominals is 0.263, the similarity between the input predicates is 0.276, and their product is 0.072. This demonstrates that the proposed technique enables proper synonymy assessment even when input predicates or input nominals are polysemous.

As described above, the synonymous expression assessment device according to the present invention relates to a synonymous expression assessment device for receiving input of binary relations each of which includes a nominal and a predicate and assessing whether or not the input binary relations are synonymous using a similarity between input nominals and a similarity between input predicates, the synonymous expression assessment device being characterized in that: when computing the similarity between the input predicates based on a distribution of occurrence frequencies of nominals that are in binary relations to the input predicate in a document set, a distribution of only nominals that are used in the same type of concept as the input nominal is used; and when computing the similarity between the input nominals based on a distribution of occurrence frequencies of predicates that are in binary relations to the input nominal in the document set, a distribution of only predicates that are used in the same type of concept as the input predicate is used.

Figure 8:
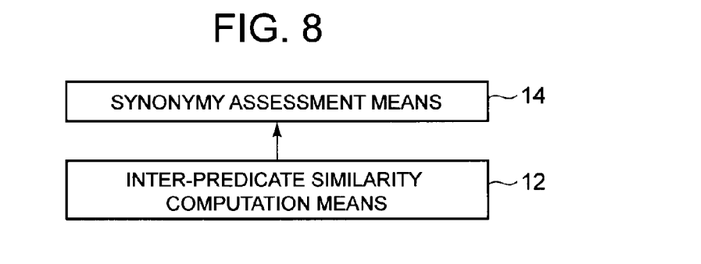
FIG. 8 is a block diagram showing an example of a minimum structure of the synonymous expression assessment device.

The following describes a minimum structure of the synonymous expression assessment device according to the present invention. FIG. 8 is a block diagram showing an example of the minimum structure of the synonymous expression assessment device. As shown in FIG. 8, the synonymous expression assessment device includes the synonymy assessment means 14 and the inter-predicate similarity computation means 12 as minimum structural elements.

In the synonymous expression assessment device of the minimum structure shown in FIG. 8, the synonymy assessment means 14 receives input of binary relations each of which includes a nominal and a predicate, and assesses whether or not the input binary relations are synonymous using a similarity between input nominals and a similarity between input predicates. The inter-predicate similarity computation means 12, when computing the similarity between the input predicates based on a distribution of occurrence frequencies of nominals that are in binary relations to the input predicate in a document set, uses a distribution of only nominals that are used in the same type of concept as the input nominal.

Thus, the synonymous expression assessment device of the minimum structure can properly assess synonymous expressions of binary relations even in the case where input predicates or input nominals are polysemous.

Note that the characteristic structures of the synonymous expression assessment device as in the following (1) to (5) are shown in this exemplary embodiment.

(1) The synonymous expression assessment device includes: synonymy assessment means (for example realized by the synonymy assessment means 14) for receiving input of binary relations each of which includes a nominal and a predicate, and assessing whether or not the input binary relations are synonymous using a similarity between input nominals and a similarity between input predicates; and inter-predicate similarity computation means (for example realized by the inter-predicate similarity computation means 12) for, when computing the similarity between the input predicates based on a distribution of occurrence frequencies of nominals that are in binary relations to the input predicate in a document set, performing the computation using a distribution of only nominals that are used in the same type of concept as the input nominal.

(2) The synonymous expression assessment device includes: synonymy assessment means (for example realized by the synonymy assessment means 14) for receiving input of binary relations each of which includes a nominal and a predicate, and assessing whether or not the input binary relations are synonymous using a similarity between input nominals and a similarity between input predicates; inter-predicate similarity computation means (for example realized by the inter-predicate similarity computation means 12) for, when computing the similarity between the input predicates based on a distribution of occurrence frequencies of nominals that are in binary relations to the input predicate in a document set, performing the computation using a distribution of only nominals that are used in the same type of concept as the input nominal; and inter-nominal similarity computation means (for example realized by the inter-nominal similarity computation means 13) for, when computing the similarity between the input nominals based on a distribution of occurrence frequencies of predicates that are in binary relations to the input nominal in the document set, performing the computation using a distribution of only predicates that are used in the same type of concept as the input predicate.

(3) The synonymous expression assessment device includes: synonymy assessment means (for example realized by the synonymy assessment means 14) for receiving input of binary relations each of which includes a nominal and a predicate, and assessing whether or not the input binary relations are synonymous using a similarity between input nominals and a similarity between input predicates; concept class storage means (for example realized by the concept class storage unit 22) for storing types of concept classes to which predicates or nominals belong; occurrence frequency correction means (for example realized by the occurrence frequency correction means 11) for determining, with reference to the types of the concept classes stored in the concept class storage means, a degree to which a predicate or a nominal included in a document set is used in the same concept as the input predicate or the input nominal, and correcting an occurrence frequency of a binary relation included in the document set according to the determined degree; inter-predicate similarity computation means (for example realized by the inter-predicate similarity computation means 12) for setting, as a feature value of the input predicate, a distribution of occurrence frequencies or corrected occurrence frequencies of nominals that are in binary relations to the input predicate in the document set, and computing a degree of similarity between feature values of the input predicates; and inter-nominal similarity computation means (for example realized by the inter-nominal similarity computation means 13) for setting, as a feature value of the input nominal, a distribution of occurrence frequencies or corrected occurrence frequencies of predicates that are in binary relations to the input nominal in the document set, and computing a degree of similarity between feature values of the input nominals.

(4) In the synonymous expression assessment device, a nominal in each binary relation may also include a particle that is in a case relation to a predicate in the binary relation.

(5) In the synonymous expression assessment device, the synonymy assessment means may assess the input binary relations as synonymous, in the case where the similarity between the input nominals and the similarity between the input predicates satisfy a predetermined condition.

Though the present invention has been described with reference to the above exemplary embodiment, the present invention is not limited to the above exemplary embodiment. Various changes understandable by those skilled in the art within the scope of the present invention can be made to the structures and details of the present invention. For example, one or more structural elements may be omitted from the structural elements shown in the exemplary embodiment, and one or more other structural elements may be combined with the structural elements shown in the exemplary embodiment.

This application claims priority based on Japanese Patent Application No. 2011-105589 filed on May 10, 2011, the disclosure of which is incorporated herein in its entirety.

Industrial Applicability

The present invention is applicable, for example, to conduct accurate search in response to a query with a complex syntactic structure such as a natural sentence.

Reference Signs List 1 data processing device
2 storage device
3 input device
4 output device
10 occurrence frequency computation means
11 occurrence frequency correction means
12 inter-predicate similarity computation means
13 inter-nominal similarity computation means
14 synonymy assessment means
20 document storage unit
21 occurrence frequency storage unit 22 concept class storage unit
23 corrected occurrence frequency storage unit

What is claimed is:

1. A synonymous expression assessment device comprising:
   a hardware including a processor,
   a synonymy assessment unit, implemented by the processor, for receiving input of binary relations each of which includes a nominal and a predicate, and assessing whether or not the input binary relations are synonymous using a similarity between input nominals and a similarity between input predicates; and
   an inter-predicate similarity computation unit, implemented by the processor, for, when computing the similarity between the input predicates based on a distribution of occurrence frequencies of nominals that are in binary relations to the input predicate in a document set, performing the computation using a distribution of only nominals that are used in the same type of concept as the input nominal.

2. A synonymous expression assessment device comprising:
   a hardware including a processor,
   a synonymy assessment unit, implemented by the processor, for receiving input of binary relations each of which includes a nominal and a predicate, and assessing whether or not the input binary relations are synonymous using a similarity between input nominals and a similarity between input predicates;
   an inter-predicate similarity computation unit, implemented by the processor, for, when computing the similarity between the input predicates based on a distribution of occurrence frequencies of nominals that are in binary relations to the input predicate in a document set, performing the computation using a distribution of only nominals that are used in the same type of concept as the input nominal; and
   an inter-nominal similarity computation unit, implemented by the processor, for, when computing the similarity between the input nominals based on a distribution of occurrence frequencies of predicates that are in binary relations to the input nominal in the document set, performing the computation using a distribution of only predicates that are used in the same type of concept as the input predicate.

3. A synonymous expression assessment device comprising:
   a hardware including a processor,
   a synonymy assessment unit, implemented by the processor, for receiving input of binary relations each of which includes a nominal and a predicate, and assessing whether or not the input binary relations are synonymous using a similarity between input nominals and a similarity between input predicates;
   a concept class storage unit for storing types of concept classes to which predicates or nominals belong;
   an occurrence frequency correction unit, implemented by the processor, for determining, with reference to the types of the concept classes stored in the concept class storage unit, a degree to which a predicate or a nominal included in a document set is used in the same concept as the input predicate or the input nominal, and correcting an occurrence frequency of a binary relation included in the document set according to the determined degree;
   an inter-predicate similarity computation unit, implemented by the processor, for setting, as a feature value of the input predicate, a distribution of occurrence frequencies or corrected occurrence frequencies of nominals that are in binary relations to the input predicate in the document set, and computing a degree of similarity between feature values of the input predicates; and
   an inter-nominal similarity computation unit, implemented by the processor, for setting, as a feature value of the input nominal, a distribution of occurrence frequencies or corrected occurrence frequencies of predicates that are in binary relations to the input nominal in the document set, and computing a degree of similarity between feature values of the input nominals.

4. The synonymous expression assessment device according to claim 1, wherein a nominal in each binary relation also includes a particle that is in a case relation to a predicate in the binary relation.

5. The synonymous expression assessment device according to claim 1, wherein the synonymy assessment unit assesses the input binary relations as synonymous, in the case where the similarity between the input nominals and the similarity between the input predicates satisfy a predetermined condition.

6. A synonymous expression assessment method, implemented by a processor, comprising:
   receiving input of binary relations each of which includes a nominal and a predicate, and assessing whether or not the input binary relations are synonymous using a similarity between input nominals and a similarity between input predicates; and
   when computing the similarity between the input predicates based on a distribution of occurrence frequencies of nominals that are in binary relations to the input predicate in a document set, performing the computation using a distribution of only nominals that are used in the same type of concept as the input nominal.

7. A non-transitory computer readable information recording medium storing a synonymous expression assessment program for causing a computer to execute:
   a synonymy assessment process of receiving input of binary relations each of which includes a nominal and a predicate, and assessing whether or not the input binary relations are synonymous using a similarity between input nominals and a similarity between input predicates; and
   an inter-predicate similarity computation process of, when computing the similarity between the input predicates based on a distribution of occurrence frequencies of nominals that are in binary relations to the input predicate in a document set, performing the computation using a distribution of only nominals that are used in the same type of concept as the input nominal.

* * * * *